United States Patent Office 3,007,821
Patented Nov. 7, 1961

3,007,821
METHOD OF HEAT TREATING A CAST ALUMINUM BRONZE ARTICLE
John F. Klement, Milwaukee, Wis., assignor to Ampco Metal, Inc., Milwaukee, Wis., a corporation of Wisconsin
No Drawing. Filed Feb. 12, 1958, Ser. No. 714,708
6 Claims. (Cl. 148—13.2)

This invention relates to a cast aluminum bronze article and more particularly to a method of fabricating and heat treating a cast aluminum bronze drum dried.

The dry creping of paper tissue is usually carried out with a Yankee-type paper machine. In this type of machine, the wet paper web, after being couched from the forming wire and partially de-watered between felts, is pressed onto the surface of a large heated cylindrical drier and dried at a desired final moisture content within a single revolution of the drier. The dried paper web is then removed from the surface of the drier by a doctor blade which rides on the drier surface.

The Yankee driers are cast or welded structures and generally have a diameter of 8 to 15 feet, a length of 10 to 15 feet and weigh in the neighborhood of 65 or 70 tons. During operation, the drum driers are subjected to both internal and external pressures. One or several pressure rolls bears against the external surface of the drier at the point where the wet sheet is first applied. These pressure rolls exert a force from 200 to 400 pounds or more per lineal inch across the entire face length of the drier. In addition to this external pressure, a heating medium, such as steam under high pressures and temperatures, is introduced into the interior of the drier and serves to dry the paper web on the outer surface of the drier.

Recently, with an increased demand for paper tissue and the like, there has been great activity in attempting to increase the production rate of the paper machines without increasing the size of the machines or the number of the drum driers. In this regard, metals having a higher thermal conductivity than iron, such as aluminum bronze, have been investigated for use as drum driers. The increased thermal conductivity of the bronze alloy unit over that of a cast or wrought iron structure means, of course, that the wet paper can be dried more rapidly and thus the machines can be run at a higher speed to obtain a greater production rate. Conversely, the higher rates of heat transfer make it possible to dry heavier webs of paper without sacrifice of machine operating speed.

In the fabrication of a cast aluminum bronze alloy drum drier, it is necessary that the cast alloy be weldable, for the large diameter dried is generally fabricated in a series of cast sections which are jointed together by welding to form the cylindrical shell of the drier. In addition to the welds joining the segments of the drier shell, some minute surface defects will generally be present when the castings are made because of the large size and shape of the castings. These surface defects are also repaired by welding.

In addition to good weldability, it is essential that the weld areas, both the fabrication welds and the weld overlays have properties which are similar to the parent metal, for if there is a substantial difference in the physical properties between the weld areas and the parent metal, operational difficulties will result.

If, for example, the welded areas in the drier shell have a different wear resistance than the parent metal, the weld areas and parent metal will wear at a different rate, thereby resulting in a loss of the precise machined tolerance necessary on the surface of the drier shell. Similarly, a difference in the corrosion resistant properties between various portions of the drier shell will also adversely affect the tolerance of the machine shell surface.

Furthermore, as the coefficient of thermal expansion of the weld areas and the cast parent metal may differ slightly, distortion of the cylindrical surface of the drier may result due to the difference in temperature.

If the weld areas and the parent metal have slight differences in tensile strength and elongation properties, the deflection of the shell as it passes under the pressure roll will vary and this will cause variation in nip pressure and operating problems. In addition, if the welded joint is parallel to the axis of the drier, the cyclic stressing of the drier as the drier rolls past the heavy pressure roll nip will be substantial.

The present invention is directed to a cast duplex phase aluminum bronze alloy pressure vessel, such as a drum drier, and to a method of heat treating designed to provide a weldable cast material and a uniformity of mechanical properties in the vessel. The cast aluminum bronze alloy is initially heat treated to provide the cast sections with properties necessary for welding the sections to form the drier structure, and the welded drier is subsequently subjected to a second heat treatment to establish uniformity of physical properties between the weld areas and the cast metal.

The alpha-beta or duplex phase aluminum bronze alloys possess more desirable mechanical and metallurgical properties than do other aluminum bronze alloys for the successful fabrication of a cast drum drier. A drum drier requires a high degree of uniformity in the physical characteristics of not only the parent metal but the weld areas and also needs excellent corrosion resistance, wear resistance and strength. These properties can be present in the fabricated drier only if the alloy selected can be cast properly and then welded successfully to either join the cast sections together or to correct surface defects which occur during casting. The duplex phase aluminum bronze alloy provides a cast alloy which can be welded, and after welding provides a uniform strong, tough, wear resistant surface.

The aluminum bronze alloy to be fabricated into the drum drier is a duplex phase material having from 8% to 12% aluminum. The following compositions, in weight percent, are examples of aluminum bronze alloys which can be employed:

| Alloy | 1 | 2 | 3 | 4 |
|---|---|---|---|---|
| Aluminum | 8.0–12.0 | 8.0–12.0 | 8.0–12.0 | 8.0–12.0 |
| Iron | 1.0–5.0 | 1.0–5.0 | 1.0–5.0 | 1.0–5.0 |
| Manganese | | 0.5–5.0 | 0.5–5.0 | |
| Nickel | | | 0.5–5.0 | 0.5–5.0 |
| Copper | balance | balance | balance | balance |

Specific examples of alloys falling within the above range are as follows in weight percent:

| Alloy | 1 | 2 | 3 | 4 |
|---|---|---|---|---|
| Aluminum | 10.0 | 9.50 | 9.25 | 9.50 |
| Iron | 2.0 | 2.25 | 3.00 | 2.50 |
| Manganese | | 2.25 | 3.00 | |
| Nickel | | | 3.00 | 3.50 |
| Copper | 88.0 | 86.0 | 81.75 | 85.50 |

In addition to the above elements, small amounts of zinc, tin, lead and silicon up to 1% can be employed in the alloy.

This alloy has fine castability, good corrosion resistance, good thermal conductivity and outstanding mechanical properties. Under normal casting conditions, the alloy tends to have low elongation and thus, in the as-cast condition, does not lend itself properly to welding. The reason for the lack of weldability is generally caused by high hardness, low elongation and an improper distribution of micro-constituents. The low elongation of the alloy coupled with an undesirable microstructure in the cast state not only causes difficulty in welding but also produces a heterogeneous surface which has a non-uniform thermal conductivity and wear resistance.

By proper heat treatment, however, the above cast alloy will be rendered weldable and uniformity with regard to surface hardness, surface finish, thermal conductivity and other mechanical properties can be established.

The general method of heat treating the cast aluminum bronze alloy to develop good weldability and uniformity of properties is to initially heat the castings to a temperature in the range of 500° F. to 800° F. at a rate up to 400° F. per hour per two inch thickness of section. A heating rate faster than 400° F. per hour per two inch thickness of section will result in hot tearing and distortion for heavy and unusual sections in that the outer portions of the section will heat faster than the inner portions, thereby resulting in tearing of the metal.

After heating to a temperature in the above mentioned range, the casting is held at this temperature for a period of time sufficient to obtain uniform distribution of heat through the section. This period of holding time is generally from 1 to 4 hours per two inches of section thickness.

After the casting has been heated uniformly, the casting is then heated to a temperature in the range of 1050° F. to 1400° F. at a rate up to 400° F. per hour per two inches of section thickness. Again, if the heating rate is faster than 400° F. per hour per two inches of section thickness, hot tearing and distortion are apt to result in the casting. The casting is then held at the temperature in the range of 1050° to 1400° F. for a period of 1 to 4 hours per two inches of section thickness to obtain a uniform distribution of temperature throughout the section.

The casting is then cooled to a temperature in the range of 400° F. to 600° F. at a rate in the range of 50° F. to 500° F. per hour per two inch section. After the casting reaches the temperature in the range of 400° F. to 600° F., it is held at this temperature until a uniform temperature distribution is obtained throughout the section. This holding time is generally not more than 4 hours per two inches of section thickness.

The casting is then cooled to room temperature at any convenient rate of cooling.

After the heat treatment, the casting, depending on chemistry, will have the following range of mechanical properties:

Tensile strength _____ p.s.i.__ 70,000 to 95,000
Yield strength _____ p.s.i.__ 28,000 to 42,000
Elongation in two inches _____ percent__ 1 to 25
Brinell hardness _____ 120 to 240

A cast section having a composition of 10.5% aluminum, 3.5% iron, 0.25% nickel and the balance copper, and having a tensile strength of 80,000 p.s.i., a yield strength of 33,000 p.s.i., an elongation in two inches of 6% and a Brinell hardness of 179 was heat treated to render the cast section weldable. The heat treatment consisted of heating the cast section to a temperature of 600° F. at a rate of 200° F. per hour per two inch section and holding the casting at this temperature for a period of two hours per two inch section. The casting was then heated to a temperature of 1200° F. at a rate of 200° F. per hour per two inch section and held at this temperature for 2 hours per two inch section. The casting was then cooled to 500° F. at a rate of 250° F. per hour per two inch section and was held at this temperature for two hours per two inch section. The casting was then cooled to room temperature at a rate of about 100° F. per hour per two inch section.

The mechanical properties of the above alloy, after the heat treatment designed to render the material homogeneous and weldable, were as follows:

Tensile strength _____ p.s.i.__ 90,000
Yield strength _____ p.s.i.__ 35,000
Elongation _____ percent__ 35
Brinell hardness _____ 170

As the drum drier operates under internal pressure and high temperature, the alloy should have good elevated temperature properties and these properties should be maintained as the drum drier is heated and cooled during the operational cycles. The fatigue and impact resistance of the cast aluminum bronze material, as treated above, was excellent for drier application. An average fatigue strength of 27,000 p.s.i. at 100,000,000 cycles and an izod impact resistance of 18 foot pounds were obtained in the cast alloy by the heat treatment.

The microstructure which results after the heat treatment in the cast alloy is approximately 60% alpha and 40% beta. This combination of micro-constituents is difficult to control in a massive casting, such as a drum drier. The heat treatment set forth above is necessary in order to produce the required amount of alpha and must be carried on at the predetermined time cycle to that a decomposition of the beta phase does not occur in the heavy section.

The heat treatment serves to render the cast alloy suitable for surface welding or extensive fabrication welding. Fabrication welding is generally necessary due to the fact that the large diameter drier shell is usually cast in sections rather than a single casting and the sections are then welded together to form the cylindrical shell. In addition, due to the large size of the cast sections, some surface imperfections will generally occur which are repaired by overlay welding.

In order to establish uniformity in physical properties between the weld area and the parent metal, it is necessary to repeat the heat treatment previously set forth. This heat treatment establishes similar properties in regard to corrosion resistance, wear resistance, fatigue life, tensile strength, thermal conductivity and toughness between both the fabrication and repair welds and the parent metal.

The weld rod to be used for welding the cast alloy has a composition substantially similar to that of the casting to be welded. However, since a portion of the aluminum of the weld rod is lost during welding and carried off in the slag, the aluminum content of the weld rod will be slightly higher than the cast alloy and generally in the range of 9.0% to 13.0%.

A specific example of a weld rod composition which can be used to weld the cast alloy containing 10.5% aluminum, 3.5% iron, 0.25% nickel and 85.75% copper is as follows in weight percent:

|  | Percent |
|---|---|
| Aluminum | 11.0 |
| Iron | 3.5 |
| Nickel | 0.25 |
| Copper | 85.25 |

During the welding operation, a portion of the aluminum is lost and carried off in the flux and the weld deposit for the above mentioned weld rod composition will be approximately as follows:

|  | Percent |
|---|---|
| Aluminum | 10.0 |
| Iron | 3.6 |
| Nickel | .25 |
| Copper | 86.15 |

After the heat treatment, this weld deposit will have the following mechanical properties which are substantially similar to those of the parent metal:

Tensile strength _____ p.s.i.__ 95,000
Yield strength _____ p.s.i.__ 38,000
Elongation _____ percent__ 15
Brinell hardness _____ 170

After the second heat treatment, the fabricated shell is completely machined on both the inner and outer surfaces to provide a uniform wall thickness and then made ready for final assembly into the drum drier unit.

With the use of the first heat treatment of the invention, the cast sections are rendered weldable and by virtue of the second heat treatment, the welded joints and repair welds will compare favorably with the plate structure in composition and physical properties.

The drum drier, made according to the present invention, has exceptional corrosion resistance. In use, the drum drier is subjected to a wide range of corrosive agents, such as wet strength resins, acids and water, and the duplex phase aluminum bronze alloy heat treated according to the invention is particularly adaptable for use as a drum drier shell.

The aluminum bronze drum drier has a substantially greater thermal conductivity than other bronze alloys or ferrous metals. For example, the coefficient of thermal conductivity of the cast aluminum bronze alloy is 0.18 in CGS units, while the coefficient of thermal conductivity of silicon bronze is 0.10 in the same units, manganese bronze is 0.14, cupro-nickel is 0.09, cast iron is 0.11 and stainless steel is 0.039. The increased thermal conductivity permits a faster drying cycle and therefore, the drier can be operated at higher speeds to increase the production rate, or conversely, a heavier web can be dried without an increase in speed. Thus, the capacity of existing paper machines can be substantially increased by replacing the conventional ferrous or other types of bronze metal drum driers with the cast aluminum bronze drum drier of the invention.

The heat treatment of the invention provides the cast aluminum bronze drier shell with a uniformity of mechanical properties including corrosion resistance, thermal conductivity, wear resistance and dimensional stability. The uniformity of thermal conductivity between the weldments and the cast sections is particularly important in a drum drier in order that the rate of drying of the paper web will be uniform over the periphery of the drier shell. If the rate of drying is not uniform, due to a difference in thermal conductivity between various portions of the shell, wet spots will be produced in the paper web which will interfere with subsequent processing of the web.

In addition, the uniformity of wear resistance throughout the surface of the drier shell will result in a more uniform wear rate of both the shell surface and the doctor blade riding on the surface.

Various modes of carrying out the invention are contemplated as being within the scope of the following claims particularly pointing out and distinctly claiming the subject matter which is regarded as the invention.

I claim:

1. A method of heat treating a cast aluminum bronze alloy article containing from 8.0% to 12.0% aluminum to obtain uniformity of physical properties in the cast alloy and to render the alloy weldable, comprising heating the article to a temperature in the range of 500° F. to 800° F. at a rate up to 400° F. per hour per two inches of section thickness, holding the article at said temperature range for a period of time sufficient to obtain equal distribution of heat throughout the article, heating the article to a temperature in the range of 1050° F. to 1400° F. at a rate up to 400° F. per hour per two inches of section thickness, holding the article at a temperature in said range of 1050° F. to 1400° F. for a sufficient period of time to obtain a uniform distribution of temperature throughout said article, cooling said article to a temperature in the range of 400° F. to 600° F. at a rate in the range of 50° F. to 500° F. per hour per two inches of section thickness, holding the article at a temperature in the range of 400° F. to 600° F. for a period of time sufficient to obtain a uniform temperature distribution throughout the article, and thereafter cooling the article to room temperature.

2. A method of heat treating a cast aluminum bronze article containing from 8 to 12% aluminum to obtain a uniformity of mechanical properties in the cast article and to render the cast article weldable, comprising heating the cast article to a temperature in the range of 500° F. to 800° F. at a rate up to 400° F. per hour per two inches of section thickness, holding the cast article at said temperature range for a period of one to four hours per two inches of section thickness, heating the cast article to a temperature in the range of 1050° F. to 1400° F. at a rate up to 400° F. per hour per two inches of section thickness, holding the cast article at a temperature in the range of 1050° F. to 1400° F. for a period of one to four hours per two inches of section thickness to obtain a uniform distribution of temperature throughout the section, cooling the cast article to a temperature in the range of 400° F. to 600° F. at a rate in the range of 50° F. to 500° F. per hour per two inches of section thickness, holding the alloy at the temperature in the range of 400° F. to 600° F. for a period of time sufficient to obtain a uniform distribution of temperature throughout the cast article and less than four hours per two inches of section thickness, and thereafter cooling the cast article to room temperature.

3. A method of heat treating a cast aluminum bronze article consisting essentially of 8.0% to 12.0% aluminum, 1.0% to 5.0% iron, 0.5% to 5.0% nickel and the balance copper to obtain a uniformity of mechanical properties in the cast article and to render the cast article weldable, comprising heating the cast article to a temperature of about 600° F. at a rate of about 200° F. per hour per two inches of section thickness, holding the cast article at the temperature of 600° F. for a period of two hours per two inches of section thickness, heating the cast article to a temperature of 1200° F. at a rate of 200° F. per hour per two inches of section thickness, holding the cast article at a temperature of about 1200° F. for a period of two hours per two inches of section thickness, cooling the cast article to a temperature of 500° F. at a rate of 250° F. per hour per two inches of section thickness, holding the cast article at a temperature of 500° F. for a period of two hours per two inches of section thickness, and cooling the cast article from the temperature of 500° F. to room temperature at a rate of about 100° F. per hour two inches of section thickness.

4. A method of heat treating a cast aluminum bronze alloy section containing from 8.0% to 12.0% aluminum to obtain uniformity of physical properties in the cast alloy and to render the alloy weldable, comprising heating the cast section to a temperature in the range of 500° F. to 800° F. at a rate up to 400° F. per hour per two inches of section thickness, holding the cast section at said temperature range for a period of time sufficient to obtain equal distribution of heat throughout the cast section, heating the cast section to a temperature in the range of 1050° F. to 1400° F. at a rate up to 400° F. per hour per two inches of section thickness, holding the cast section at a temperature in said range of 1050° F. to 1400° F. for a sufficient period of time to obtain a uniform distribution of temperature throughout said cast section, cooling said cast section to a temperature in the range of 400° F. to 600° F. at a rate in the range of 50° F. to 500° F. per hour per two inches of section thickness, holding the cast section at a temperature in the range of 400° F. to 600° F. for a period of time sufficient to obtain a uniform temperature distribution throughout the cast section, thereafter cooling the cast section to room temperature, welding a series of the cast sections together to form a generally cylindrical drum drier shell, and repeating the aforementioned steps of heat treatment for said drum drier shell to establish the uniformity of mechanical properties between the welded joints and the cast sections.

5. A method of heat treating a cast aluminum bronze section containing from 8 to 12% aluminum to obtain a uniformity of mechanical properties in the cast section and to render the cast section weldable, comprising heating the cast section to a temperature in the range of 500° F. to 800° F. at a rate up to 400° F. per hour per two inches of section thickness, holding the cast section at said temperature range for a period of one to four hours per two inches of section thickness, heating the cast section to a temperature in the range of 1050° F. to 1400° F. at a rate up to 400° F. per hour per two inches of section thickness, holding the cast section at a temperature in the range of 1050° F. to 1400° F. for a period of one to four hours per two inches of section thickness to obtain a uniform distribution of temperature throughout the section, cooling the cast section to a temperature in the range of 400° F. to 600° F. at a rate in the range of 50° F. to 500° F. per hour per two inches of section thickness, holding the alloy at the temperature in the range of 400° F. to 600° F. for a period of time sufficient to obtain a uniform distribution of temperature throughout the cast section and less than four hours per two inches of section thickness, thereafter cooling the cast section to room temperature, welding a series of the cast sections together to form a generally cylindrical drum drier shell, and repeating the above steps of heat treatment for said drum drier shell to establish the uniformity of mechanical properties between the welded joints and the cast sections.

6. A method of heat treating a cast aluminum bronze alloy article containing from 8.0% to 12.0% aluminum to obtain uniformity of physical properties in the cast alloy and to render the alloy weldable, comprising heating the article to a temperature in the range of 1050° F. to 1400° F. at a rate up to 400° F. per hour per two inches of section thickness, holding the article at the temperature in said range of 1050° F. to 1400° F. for a sufficient period of time to obtain a uniform distribution of heat throughout said article, cooling said article to a temperature in the range of 400° F. to 600° F. at a rate in the range of 50° F. to 500° F. per hour per two inches of section thickness, holding the article at a temperature in the range of 400° F. to 600° F. for a period of time sufficient to obtain a uniform temperature distribution throughout the article, and thereafter cooling the article to room temperature.

References Cited in the file of this patent

UNITED STATES PATENTS

| | | |
|---|---|---|
| 1,569,130 | Nemitof | Jan. 12, 1926 |
| 2,184,716 | Hermsen et al. | Dec. 26, 1939 |
| 2,216,379 | Tookousian | Oct. 1, 1940 |
| 2,715,577 | Payne et al. | Aug. 16, 1955 |

FOREIGN PATENTS

| | | |
|---|---|---|
| 547,217 | Great Britain | Aug. 19, 1942 |
| 634,870 | Great Britain | Mar. 29, 1950 |
| 200,788 | Australia | Feb. 6, 1956 |

OTHER REFERENCES

Metals Handbook 1948 ed., pages 930–933.
Aluminum Bronze, Copper Development Assoc., pp. 62, 63, 1938.
Copper and Copper Alloys, ASM, pp. 162–167, 1948.
Atlas of Isothermal Transformation Diagrams, U.S. Steel, 1951, pp. 1–30.

UNITED STATES PATENT OFFICE
CERTIFICATION OF CORRECTION

Patent No. 3,007,821                                    November 7, 1961

John F. Klement

It is hereby certified that error appears in the above numbered patent requiring correction and that the said Letters Patent should read as corrected below.

Column 1, lines 12 and 51, for "dried", each occurrence, read -- drier --; column 4, line 2, for "35" read -- 18 --; line 20, for "to" read -- so --; column 6, line 44, after "hour" insert -- per --.

Signed and sealed this 10th day of April 1962.

(SEAL)
Attest:

ERNEST W. SWIDER                                     DAVID L. LADD
Attesting Officer                                      Commissioner of Patents